(12) United States Patent
Borghi et al.

(10) Patent No.: US 11,648,592 B2
(45) Date of Patent: May 16, 2023

(54) SYSTEM FOR TREATING WASH WASTE LIQUID, ADAPTED FOR APPLICATION IN A CONTINUOUS TUNNEL WASHING MACHINE IN THE FIELD OF PRECLINICAL PHARMACEUTICAL RESEARCH

(71) Applicant: IWT S.R.L., Casale Litta (IT)

(72) Inventors: Matteo Borghi, Legnano (IT); Michele Vitali, Angera (IT)

(73) Assignee: IWT S.R.L., Casale Litta (IT)

( * ) Notice: Subject to any disclaimer, the term of this patent is extended or adjusted under 35 U.S.C. 154(b) by 525 days.

(21) Appl. No.: 16/703,906

(22) Filed: Dec. 5, 2019

(65) Prior Publication Data
US 2020/0179991 A1    Jun. 11, 2020

(30) Foreign Application Priority Data
Dec. 5, 2018    (IT) .......................... 102018000010811

(51) Int. Cl.
*B08B 3/14*       (2006.01)
*A01K 1/01*      (2006.01)
(Continued)

(52) U.S. Cl.
CPC ................. *B08B 3/14* (2013.01); *A01K 1/01* (2013.01); *A01K 1/031* (2013.01); *A46B 9/026* (2013.01);
(Continued)

(58) Field of Classification Search
None
See application file for complete search history.

(56) References Cited

U.S. PATENT DOCUMENTS

| 781,039 A | * | 1/1905 | Weabe | ................... B01D 29/05 |
| | | | | 210/414 |
| 1,100,435 A | * | 6/1914 | Lange | .................. B01D 33/067 |
| | | | | 210/404 |

(Continued)

FOREIGN PATENT DOCUMENTS

| EP | 2604350 | 6/2013 |
| EP | 3663009 A1 | * | 6/2020 | ............... A01K 1/01 |

(Continued)

OTHER PUBLICATIONS

Rapporto di Ricerca e Opinione Scritta [Search Report and Written Opinion] Dated Sep. 18, 2019 From the Ministero dello Sviluppo Economico, Direzione Generale Sviluppo Produttivo e Competitivita, Uffico Italiano Brevetti e Marchi Re. Application No. IT201800010811. (7 Pages).

*Primary Examiner* — Robert J Popovics (57) ABSTRACT

A system for treating wash waste liquid is described, configured for coupling to a wash module of a continuous Tunnel washing machine for the field of Preclinical Pharmaceutical Research, said wash module (12) comprising a wash chamber (25), characterized in that it comprises:
  a wash tub (22) with a side wall (31) substantially cylindrical in shape, with a tangential liquid suction outlet (33) and a substantially conical bottom, with a wash waste drain point (35) at the vertex of the cone, said tangential suction being adapted to generate a rotational motion of the liquid in said tub, said tub being positioned under said wash chamber (25), so as to receive said wash liquid by gravity;
  a centrifugal wash pump (21) with an open impeller, adapted to take in liquid from said tangential liquid suction outlet (33);
  an in-line filter (26) with an internal filter cartridge of the "wedge-wire" type, adapted to filter the liquid coming (Continued)

from said centrifugal pump (21) and deliver it back, filtered, into said wash chamber (25), and comprising a flush valve (27) for discharging the filtering waste.

14 Claims, 10 Drawing Sheets

(51) Int. Cl.
    *A01K 1/03*      (2006.01)
    *A46B 9/02*      (2006.01)
    *A46B 13/00*      (2006.01)
    *B01D 29/35*      (2006.01)
    *B01D 29/64*      (2006.01)
    *B01D 29/66*      (2006.01)
    *B01D 29/90*      (2006.01)
    *B01D 29/92*      (2006.01)
    *B01D 35/02*      (2006.01)
    *B01D 39/20*      (2006.01)
    *B08B 3/04*      (2006.01)

(52) U.S. Cl.
    CPC .......... *A46B 13/001* (2013.01); *B01D 29/356* (2013.01); *B01D 29/6415* (2013.01); *B01D 29/668* (2013.01); *B01D 29/90* (2013.01); *B01D 29/92* (2013.01); *B01D 35/02* (2013.01); *B01D 39/2027* (2013.01); *B08B 3/041* (2013.01); *B01D 2201/325* (2013.01)

(56) References Cited

U.S. PATENT DOCUMENTS

| | | | | |
|---|---|---|---|---|
| 1,510,863 A * | 10/1924 | Rose | B01D 29/6415 | 210/414 |
| 1,525,449 A * | 2/1925 | Johnson | B01D 29/66 | 210/414 |
| 1,856,685 A * | 5/1932 | Anderson | B01D 46/0046 | 55/521 |
| 1,950,466 A * | 3/1934 | Wille | B01D 33/50 | 210/392 |
| 1,968,741 A * | 7/1934 | Burrell | B01D 33/503 | 210/392 |
| 2,125,532 A * | 8/1938 | Wells | B01D 29/118 | 210/414 |
| 2,275,958 A * | 3/1942 | Hagel | B01D 35/16 | 210/414 |
| 2,408,741 A * | 10/1946 | Dodge | B01D 29/356 | 210/355 |
| 2,606,663 A * | 8/1952 | Blackman | F16L 55/24 | 210/451 |
| 2,652,153 A * | 9/1953 | Perrault | F16L 55/24 | 210/355 |
| 2,713,921 A * | 7/1955 | Turner | B01D 46/681 | 55/296 |
| 2,747,741 A * | 5/1956 | Jacobson | B01D 29/46 | 210/411 |
| 3,103,936 A * | 9/1963 | Nolte | A47L 15/241 | 134/107 |
| 3,166,082 A * | 1/1965 | Arnold | C23G 3/00 | 134/143 |
| 3,379,312 A * | 4/1968 | Brown | B01D 35/147 | 210/457 |
| 3,731,815 A * | 5/1973 | Collingwood | B01D 35/023 | 210/497.2 |
| 3,762,563 A * | 10/1973 | Petersen | B01D 29/6476 | 210/415 |
| 3,905,827 A * | 9/1975 | Goffredo | B08B 3/022 | 210/688 |
| 3,959,140 A * | 5/1976 | Legras | B01D 29/94 | 210/489 |
| 3,997,441 A * | 12/1976 | Pamplin, Jr. | B01D 37/02 | 210/791 |
| 4,085,050 A * | 4/1978 | Gervasi | B01D 29/52 | 210/414 |
| 4,125,120 A * | 11/1978 | Standley | A47L 15/16 | 134/152 |
| 4,209,344 A * | 6/1980 | Simon | B08B 9/22 | 134/25.4 |
| 4,379,058 A * | 4/1983 | Bolton | D21D 5/023 | 210/791 |
| 4,498,934 A * | 2/1985 | Potts | B08B 3/022 | 134/29 |
| 4,592,847 A * | 6/1986 | Schumacher | B01D 29/94 | 210/186 |
| 4,662,893 A * | 5/1987 | McIntosh | B01D 11/0273 | 210/174 |
| 4,709,713 A * | 12/1987 | Kuhl | A01K 31/165 | 198/848 |
| 4,821,754 A * | 4/1989 | Weil | B27L 5/00 | 134/122 R |
| 4,874,003 A * | 10/1989 | Weil | B27L 5/00 | 134/122 R |
| 4,931,180 A * | 6/1990 | Darchambeau | B01D 29/356 | 210/414 |
| 5,106,487 A * | 4/1992 | Nemedi | B07B 4/02 | 209/136 |
| 5,164,079 A * | 11/1992 | Klein | B01D 29/117 | 210/411 |
| 5,198,111 A * | 3/1993 | Davis | B01D 29/6438 | 210/414 |
| 5,257,739 A * | 11/1993 | Pascaru | F16L 27/047 | 285/332 |
| 5,273,665 A * | 12/1993 | White | C02F 3/101 | 210/414 |
| 5,370,791 A * | 12/1994 | Lescovich | B01D 29/60 | 210/392 |
| 5,419,349 A * | 5/1995 | Swain | B08B 3/022 | 134/131 |
| 5,429,247 A * | 7/1995 | Lemay | B07B 1/00 | 209/268 |
| 5,433,229 A * | 7/1995 | Blair | B08B 3/022 | 134/201 |
| 5,482,066 A * | 1/1996 | Krueger | B08B 3/022 | 476/64 |
| 5,497,798 A * | 3/1996 | Fritz | A47L 15/241 | 134/131 |
| 5,564,448 A * | 10/1996 | Lincoln | B05B 15/658 | 134/131 |
| 5,566,890 A * | 10/1996 | Ricciardelli | B29B 17/04 | 241/DIG. 38 |
| 5,603,342 A | 2/1997 | Shambaugh | | |
| 5,660,196 A * | 8/1997 | Bein | F16L 37/248 | 134/131 |
| 5,775,348 A * | 7/1998 | Rush | B08B 3/022 | 134/107 |
| 5,817,241 A * | 10/1998 | Brayboy | B01D 29/94 | 119/451 |
| 5,824,229 A * | 10/1998 | Larkey | B01D 29/682 | 210/791 |
| 5,914,049 A * | 6/1999 | Brauch | B01D 21/2477 | 210/527 |
| 5,964,955 A * | 10/1999 | Rochette | B08B 3/02 | 134/201 |
| 5,993,739 A * | 11/1999 | Lyon | B08B 3/022 | 134/29 |
| 6,079,427 A * | 6/2000 | Perry, Jr. | B01D 29/035 | 210/407 |
| 6,090,218 A * | 7/2000 | Brackmann | G06Q 30/0238 | 134/201 |
| 6,161,560 A * | 12/2000 | Brink | B08B 3/022 | 134/131 |
| 6,238,516 B1 * | 5/2001 | Watson | B29B 17/02 | 162/57 |
| 6,269,823 B1 * | 8/2001 | Lincoln | B08B 9/34 | 134/131 |
| 6,495,031 B1 * | 12/2002 | Bratten | B01D 29/6423 | 210/392 |

(56) References Cited

U.S. PATENT DOCUMENTS

| | | | | |
|---|---|---|---|---|
| 6,511,595 B2* | 1/2003 | Crompton | B01D 21/26 | 210/309 |
| 6,814,089 B1* | 11/2004 | Voges | B08B 3/14 | 134/122 R |
| 6,846,421 B2* | 1/2005 | Bratten | B01D 29/096 | 210/387 |
| 6,916,445 B2* | 7/2005 | Centanni | A61L 2/087 | 422/23 |
| 7,465,391 B2* | 12/2008 | Heist | B01D 29/03 | 210/791 |
| 7,621,285 B2* | 11/2009 | Robert | F26B 15/18 | 134/72 |
| 8,297,447 B2* | 10/2012 | Sorenson | B01D 29/6453 | 210/411 |
| 8,307,993 B2* | 11/2012 | Yoshida | B01D 29/58 | 210/243 |
| 8,673,156 B2* | 3/2014 | Griffin | B01D 17/085 | 210/175 |
| 9,211,489 B2* | 12/2015 | Riggers | B08B 5/04 | |
| 9,427,780 B2* | 8/2016 | Houle | B07B 1/46 | |
| 9,580,854 B2* | 2/2017 | Poy | D06F 35/005 | |
| 9,616,363 B2* | 4/2017 | Osman Oguz | B01D 29/94 | |
| 10,450,688 B2* | 10/2019 | Poy | D06F 31/005 | |
| 10,646,801 B2* | 5/2020 | Tameroglu | B01D 29/6415 | |
| 11,260,325 B2* | 3/2022 | Dai | C02F 1/004 | |
| 11,358,077 B2* | 6/2022 | Muenzer | A61L 2/18 | |
| 11,484,818 B2* | 11/2022 | De Los Reyes, III | B01D 29/114 | |
| 2003/0110815 A1* | 6/2003 | Poy | D06F 31/005 | 68/58 |
| 2005/0263448 A1* | 12/2005 | Heist | B01D 29/906 | 210/306 |
| 2008/0302139 A1* | 12/2008 | Zorn | D06F 35/001 | 68/12.18 |
| 2010/0096310 A1* | 4/2010 | Yoshida | B01D 29/35 | 210/151 |
| 2010/0108620 A1* | 5/2010 | Sorenson | B01D 29/684 | 210/791 |
| 2010/0206339 A1* | 8/2010 | Jakobsen | B08B 3/022 | 134/32 |
| 2010/0213141 A1* | 8/2010 | Griffin | C02F 1/12 | 210/182 |
| 2011/0185516 A1* | 8/2011 | Zorn | D06F 31/00 | 68/5 D |
| 2011/0204004 A1* | 8/2011 | Bremner | C02F 9/00 | 210/805 |
| 2013/0087495 A1* | 4/2013 | Riggers | B01D 46/04 | 210/415 |
| 2016/0053425 A1* | 2/2016 | Wolff | C02F 1/283 | 68/10 |
| 2016/0214039 A1* | 7/2016 | Tameroglu | B01D 29/6446 | |
| 2017/0014736 A1* | 1/2017 | Osman Oguz | B01D 29/23 | |
| 2017/0335499 A1* | 11/2017 | Poy | C11D 11/0064 | |
| 2018/0126020 A1 | 5/2018 | Gil | | |
| 2019/0030574 A1* | 1/2019 | Alvarez | B08B 3/14 | |
| 2020/0047092 A1* | 2/2020 | Muenzer | B08B 9/28 | |
| 2020/0179991 A1* | 6/2020 | Borghi | B01D 39/2027 | |
| 2021/0205741 A1* | 7/2021 | Dai | B01D 29/902 | |
| 2021/0362078 A1* | 11/2021 | De Los Reyes, III | B01D 29/33 | |
| 2022/0016552 A1* | 1/2022 | Mania | C02F 11/122 | |
| 2023/0032178 A1* | 2/2023 | Kulakowski | D06F 31/005 | |

FOREIGN PATENT DOCUMENTS

| | | | |
|---|---|---|---|
| WO | WO 2007/108707 | 9/2007 | |
| WO | WO 2016/193943 | 12/2016 | |
| WO | WO-2016193943 A1 * | 12/2016 | A01K 1/01 |

* cited by examiner

SYSTEM FOR TREATING WASH WASTE LIQUID, ADAPTED FOR APPLICATION IN A CONTINUOUS TUNNEL WASHING MACHINE IN THE FIELD OF PRECLINICAL PHARMACEUTICAL RESEARCH

RELATED APPLICATIONS

This application claims the benefit of priority of Italian Patent Application No. 102018000010811 filed on Dec. 5, 2018, the contents of which are incorporated herein by reference in their entirety.

FIELD AND BACKGROUND OF THE INVENTION

The present invention relates to a system for treating wash waste liquid, configured for use in a continuous Tunnel washing machine for the field of Preclinical Pharmaceutical Research, particularly for washing breeding cages for animals to be used for research purposes, as well as various other components used in preclinical pharmaceutical research centres.

It is known that in the field of preclinical pharmaceutical research it is necessary to use wash systems that allow cleaning the breeding cages for animals used for research purposes and various other components used during the breeding process.

The wash procedures known in the art, the purpose of which is to remove contaminants, food residues and animal excrements, as well as bedding and any enrichment placed on the cage bottom to make the animals more comfortable, are of three types:

Manual: by executing a special procedure using water jets and/or detergent, the operator removes the residues manually from dirty cages/components; the operator then rinses the same by using the same technology.

Automatic by means of batch-type washing machines: in this case, the cages/components are housed inside a suitable wash chamber, in which, through dedicated washing and rinsing systems, residues are removed from the dirty cages according to a specific sequence. The machines usually include a wash chamber, a wash liquid accumulation tub, a recirculation system with wash spray nozzles, and a rinsing system with rinse spray nozzles either directly connected to the water mains or with dedicated accumulation and recirculation. These machines may also be equipped with hot-air blowing systems for drying the cages/components at the end of the wash cycle. Suitable detergents may be added to the wash liquid, and the bath temperature may be controlled and increased by means of suitable direct or indirect heat exchangers.

Automatic by means of continuous washing machines: in this case, the cages/components are loaded (whether manually or by automatic systems) onto a washing machine that includes a continuous conveyor system (belt), which transports the cages/components into open wash/rinse/blow chambers. At the end of the process, the same cages/components are unloaded from the belt (whether manually or by automatic systems). These machines are usually made up of a number of modules depending on specific requirements, but always comprise at least one wash module including a wash chamber, an accumulation tub and a washing bath recirculation system with a centrifugal pump connected to wash spray nozzles, and a rinse module including a rinse chamber, rinse sprayers connected to the water mains and/or to the bath recirculation system, with a dedicated centrifugal pump. In this case as well, suitable detergents may be added to the wash liquid, and the bath temperature may be controlled and increased by means of suitable direct or indirect heat exchangers.

As regards automatic machines, during the wash process any residues of dirt on the surface of the cages/components are removed. In this specific field, such residues are also of solid nature, since they include food for feeding the animals and various types of stabling bedding and accessories that are mixed, during the breeding process, with animal excrements/urine/hair.

For this reason, such machines employ filtering systems adapted to protect the wash nozzles against the risk of clogging, which would result in an ineffective wash process.

Such systems may be of two types:
1) Static: such filters have limited capacity, and once clogged they require the intervention of an operator to restore the functionality of the system.
2) Self-cleaning: such filters are provided with self-cleaning systems that minimize the need for manual intervention.

In batch-type automatic machines, restoration of static systems and any automatic self-cleaning procedures may occur between batches and/or during non-washing phases.

In continuous washing machines, restoration of static systems may only occur after stopping the machine and, unlike batch-type machines, self-cleaning systems cannot exploit the idle times between washing cycles.

Therefore, static filters are generally acceptable in high-dirt or low-productivity situations, and the operator can clean them manually at the end of the working day.

Where high productivity is required or the amount of dirt is considerable, however, it is necessary to employ self-cleaning systems, with the resulting complexity.

Counter-pressure and counter-wash automatic filter cleaning systems are notoriously effective. In this case, the filter (usually consisting of a cylindrical filter cartridge inserted in a container) installed along the hydraulic line of the washing bath is cleaned at regular intervals by a pressurized flow opposite to the normal flow direction. These types of filters, which require a high counter-wash frequency, are not usually employed in continuous machines, but only in batch-type machines.

Other systems utilize an inclined flat filter interposed between the wash chamber and the tub containing the wash bath (just like static filters): systems for removing accumulated dirt residues (filter wipers) are then applied to this filter, which convey the removed residues into a collection area.

Both of these systems, when applied to continuous machines, suffer from some known problems:
1) With an in-line filter and counter-pressure cleaning, the self-cleaning process must be carried out at frequent intervals: if the filter cartridge becomes overfilled between one counter-cleaning cycle and the next (even if the filter still has sufficient filtering capacity during the process), it will become impossible to restore the filter by counter-pressure. Over time, this will lead to complete obstruction of the filter, resulting in the need for manual cleaning operations, which may be rather complex. Moreover, counter-cleaning requires a considerable amount of wash bath, which is expelled during the process, so that much time is necessary for restoring the bath volume, temperature and detergent concentration. On a continuous machine, this task could only be carried out when the machine is stopped, when it might already prove ineffective. Control systems may be implemented, but it is clear that, due to the continuous nature of the machine, frequent stops may be unacceptable. Moreover, since in this case the filter can only be installed on the delivery side of the centrifugal pump for bath circulation, where there is sufficient pressure, all residues will go through the impeller, and in a continuous process this may lead to blockage of the impeller itself.

2) With flat filters and filter wipers, the essential problem is the complexity of the system. Furthermore, the filter wiper, which is typically a brush, crushes dirt residues on the filter until they inevitably go through the filtering wire mesh. The filtering area may need to be quite large, thus affecting design choices as to the tub geometry. In addition, it is necessary to provide a suitable seal between the filtering wire mesh and its housing in the tub: this is not always an easy task, and tightness is not always ensured.

With both of these systems, the process being continuous, dirt residues are constantly macerated and dissolve into the wash bath. For this reason, a restoration is usually made with clean water (compatibly with any consumption constraints), which however only permits the removal of floating dirt residues by overflow. The remaining macerated residues in solution in the wash bath attach to the walls of the wash tub and especially to the bottom thereof, accumulating thereon without being removed by any means even when the tubs are drained at the end of the day or when the wash bath is replaced.

As an alternative, upstream of the wash system it is possible to arrange a system that will eliminate the thickest part of the residues: such systems are essentially of two types:

1) Mechanical scraper: a scraper removes the thickest part of the residues. This operation may be carried out by the operator or by an automatic system. In the former case, the result of the operation depends on the operator's sensitivity, whereas in the latter case the systems are complex, since they include additional robots or axes and are not very flexible (they can process only one or only a few types of cages).

2) Water scraper: in this case, a throwaway high-pressure water jet is used for the removal operation. It is clear that in this case the problem is the huge water consumption necessary for the execution of this step.

When water-based solutions are employed, at any rate, the solid dirt part removed will dissolve into the wash bath, and sooner or later will be drained along with it: it is apparent that separating this part of dirt from the remaining waste is a problem that cannot be easily solved. It is possible, in fact, that the rules and laws of the country where the machine is to be installed do not allow for free dumping of particulate, and the animal breeding department is likely to lack a centralized treatment system.

In this case as well, solutions are available on the market which employ scrolls and brushes, the construction of which is however very complex.

Another known problem relates to the height of the loading plane of continuous washing machines, which must be within the limits set forth by the law in order to comply with operator ergonomics criteria.

In the continuous washing machines currently known in the art, therefore, the bath level is very low with respect to the inlet port of the centrifugal circulation pump, with limited priming capabilities especially when working in the presence of detergents and high bath temperatures.

In order to prevent the centrifugal pump from suffering possible cavitation phenomena, complex and costly solutions are resorted to, such as, for example, specially shaped intake channels, which will nevertheless reduce the performance of the machine.

Patent application WO2007/108707-A1 describes an apparatus for recovering gold and other metals by screening slurry containing gold or metals. A mesh-type filter element in a tub separates stones or big fragments from the slurry, which would not pass through the next gold recovery apparatuses. The filtering mesh also includes a system of rotary rigid blades. Therefore, this apparatus is unsuitable for application to a washing system like those addressed by the present invention.

Patent application EP2604350-A1 describes a system for treating the detergent solution used in a washing or rinsing system for bottle-type containers. The system receives the detergent solution from an external tub and comprises a rotary filter element and a fixed scraper blade. This system is, therefore, also unsuitable for application to a washing system like those addressed by the present invention.

SUMMARY OF THE INVENTION

It is therefore an object of the present invention to propose a system for treating wash waste liquid, configured for use in a continuous Tunnel washing machine for the field of Preclinical Pharmaceutical Research, which is aimed at overcoming all of the above-mentioned problems.

The present invention intends to develop, within the washing unit of a continuous TUNNEL-type machine, a system for processing the above-described dirt residues while eliminating the known drawbacks of prior-art systems.

The system of the invention comprises an in-line filtering system, within the washing unit, which can clean itself automatically with a water consumption compatible with the standard consumption of the machine, and which executes the self-cleaning when it does not affect the washing performance. Such a system further comprises a mechanism for separating the solid part from the rest of the wash bath as the latter is conveyed towards the drain.

The present invention relates to a system for treating wash waste liquid, configured for coupling to a wash module of a continuous Tunnel washing machine for the field of Preclinical Pharmaceutical Research, said wash module comprising a wash chamber, characterized in that it comprises:

a wash tub with a side wall substantially cylindrical in shape, with a tangential liquid suction outlet in the tub bottom area, and a substantially conical bottom, the conicity of which faces towards the outside of the tub, with a wash waste drain point at the vertex of the cone, said tangential suction being adapted to generate a rotational motion of the liquid in said tub, said tub being positioned under said wash chamber, so as to receive said wash liquid by gravity;

a centrifugal wash pump with an open impeller, adapted to take in liquid from said tangential liquid suction outlet, an in-line filter with an internal filter cartridge of the "wedge-wire" type, adapted to filter the liquid coming from said centrifugal pump and deliver it back, filtered, into said wash chamber, and comprising a flush valve for discharging the filtering waste.

It is a particular object of the present invention to provide a system for treating wash waste liquid, adapted for use in a continuous Tunnel washing machine for the field of Preclinical Pharmaceutical Research, as will be further described in the claims, which are an integral part of the present description.

BRIEF DESCRIPTION OF THE SEVERAL VIEWS OF THE DRAWINGS

Further objects and advantages of the present invention will become apparent from the following detailed description of a preferred embodiment (and variants) thereof referring to the annexed drawings, which are only supplied by way of non-limiting example, wherein:

FIGS. 3.1 and 3.2 show schematic views of the wash tub, which is a part of the system for treating wash waste liquid of the present invention;

In the drawings, the same reference numerals and letters identify the same items or components.

DESCRIPTION OF SPECIFIC EMBODIMENTS OF THE INVENTION

The tunnel-type system (FIG. 1) is made up of a series of in-line modules. Typically, the most common configuration includes a load module 11 of a substantially known type, followed by a wash module 12, to which the present invention applies, a rinse module 13 of a substantially known type, a blow module 14 of a substantially known type, and an unload module 15 of a substantially known type.

Figure 1:
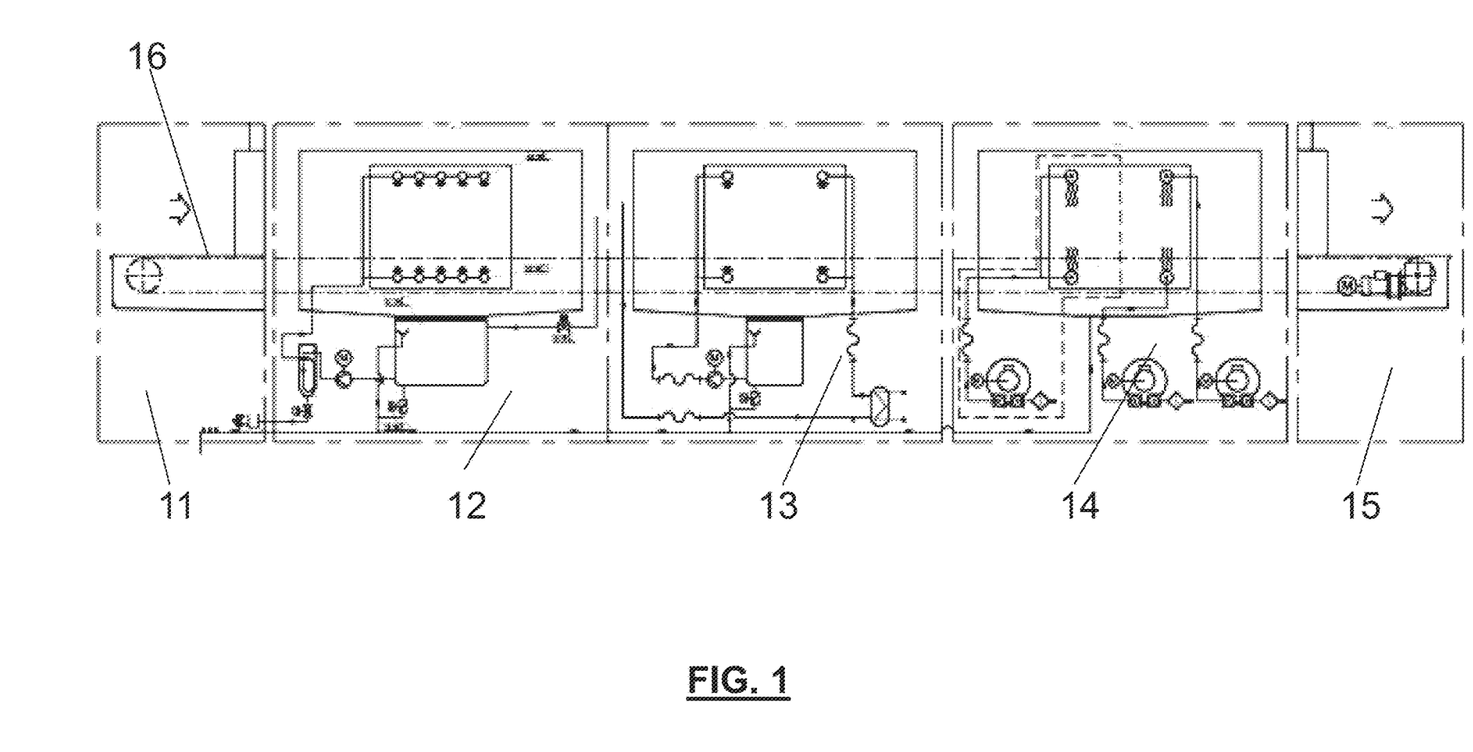
FIG. 1 shows a general diagram of a continuous TUNNEL-type machine comprising the system for treating wash waste liquid of the present invention.

The cages/components to be washed are loaded onto the load module 11, and then a belt 16, which is common to all modules, carries them towards the wash module 12 and the remaining modules 13, 14 and 15 that follow.

Removal of the dirt (including solid dirt) occurs in the wash module 12, where the dirt is collected and processed by the machine.

In the wash module (FIG. 2), a wash pump 21, by taking in washing solution (water and detergent at a given temperature) from a tub 22, generates a wash flow towards the nozzles 23, 24 in the wash chamber 25. The wash flow hits in all directions the cages/components that are present in the area of the tub 25 between the nozzles.

Figure 2:
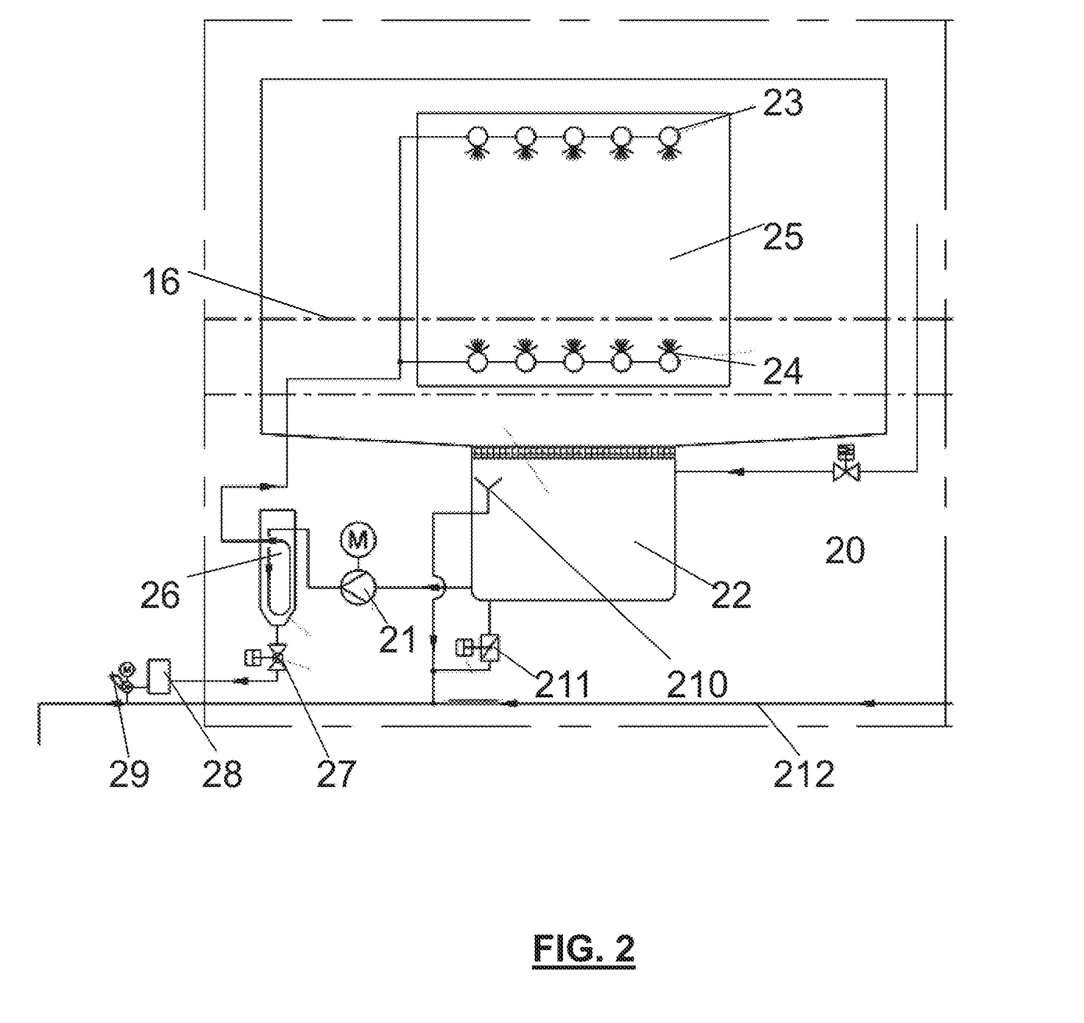
FIG. 2 shows a general diagram of the wash module of the machine of FIG. 1, which comprises the system for treating wash waste liquid of the present invention.

The wash flow containing wash waste (solid, semisolid and liquid dirt) falls into said tub 22 positioned under the nozzles, and in prior-art machines causes the above-listed problems.

In order to solve said problems, the system for treating wash waste liquid of the present invention, whether included in or coupled to the wash module, comprises, in particular, one or more of the following elements.

Figure 31:
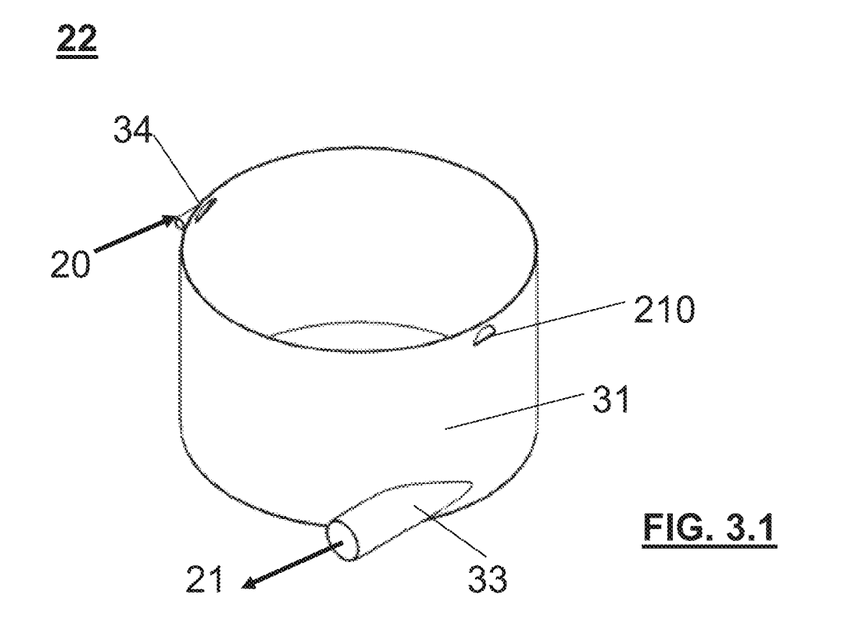
Figure 32:
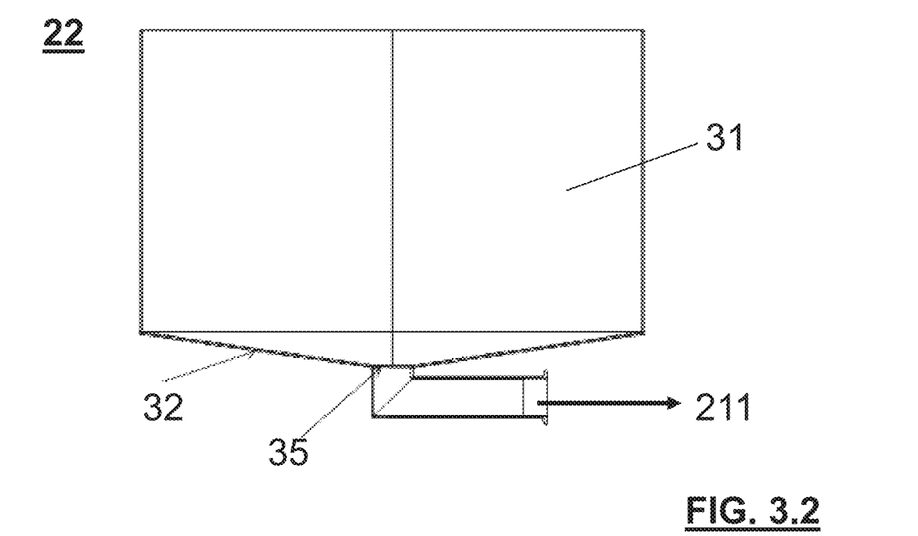

1) A wash tub 22 with a side wall substantially cylindrical in shape, with a tangential suction outlet in the tub bottom region, and a substantially conical bottom, the conicity of which faces towards the outside of the tub, with a wash drain point at the vertex of the cone (hereafter described with reference to FIGS. 3.1, 3.2).

Figure 4:
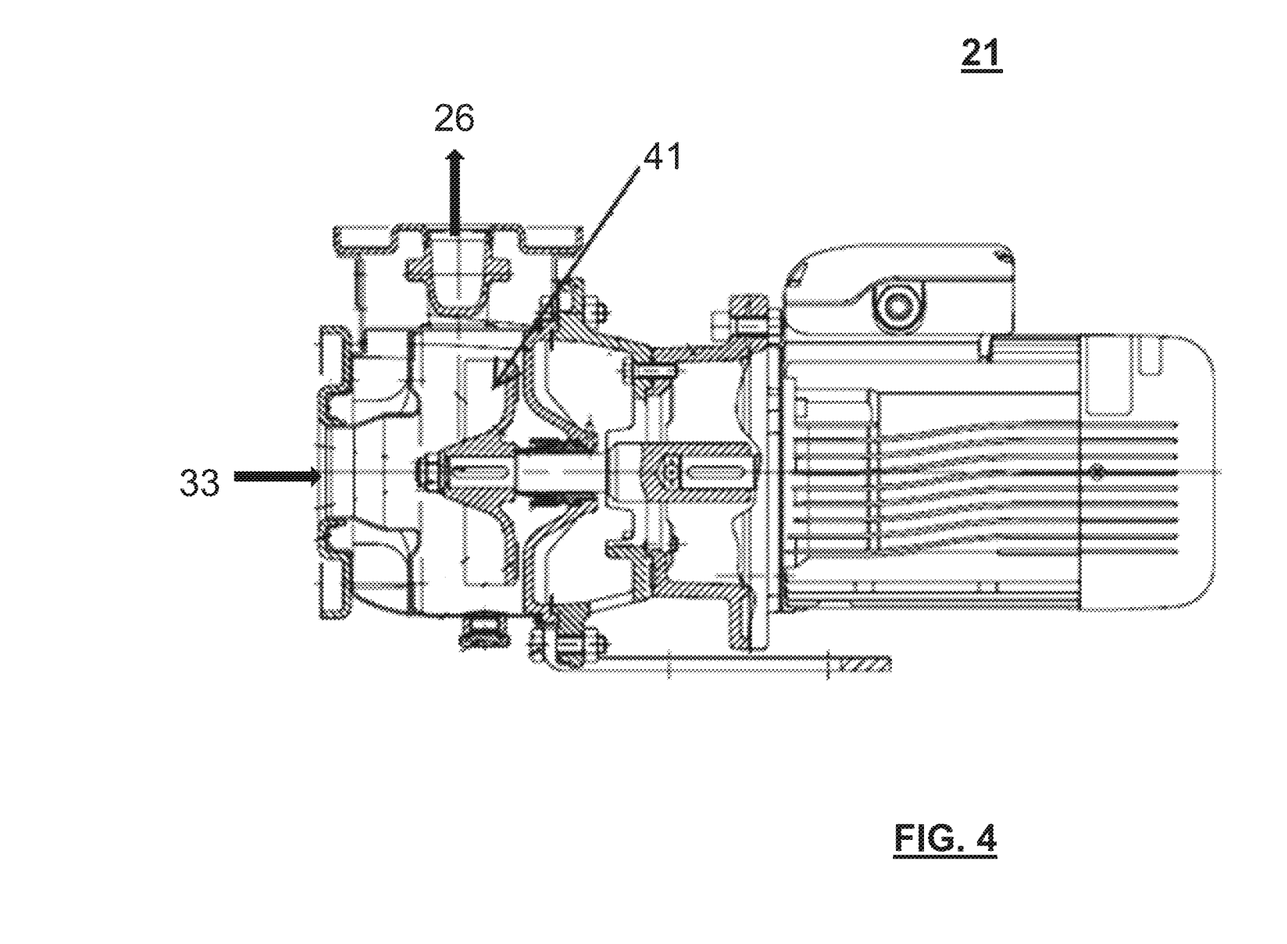
FIG. 4 shows a partially sectioned side view of the centrifugal pump component, which is a part of the system for treating wash waste liquid of the present invention.

2) A centrifugal wash pump 21 with an open impeller (hereafter described with reference to FIG. 4), which takes in the bath from the suction outlet of the wash tub 22.

Figure 5:
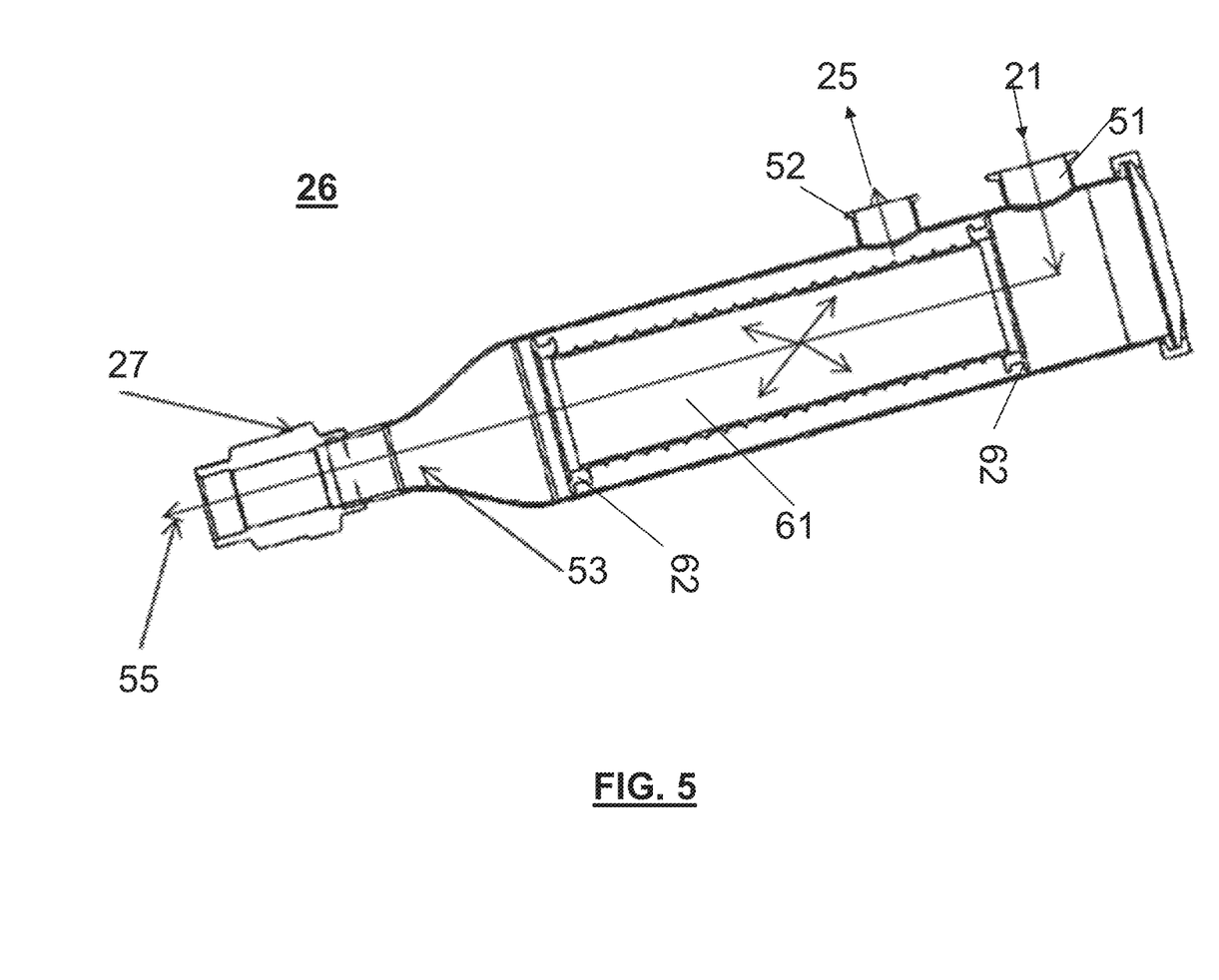
FIGS. 5, 6 and 7 show schematic views of the in-line filter and the internal filter cartridge, which are parts of the system for treating wash waste liquid of the present invention.
Figure 6:
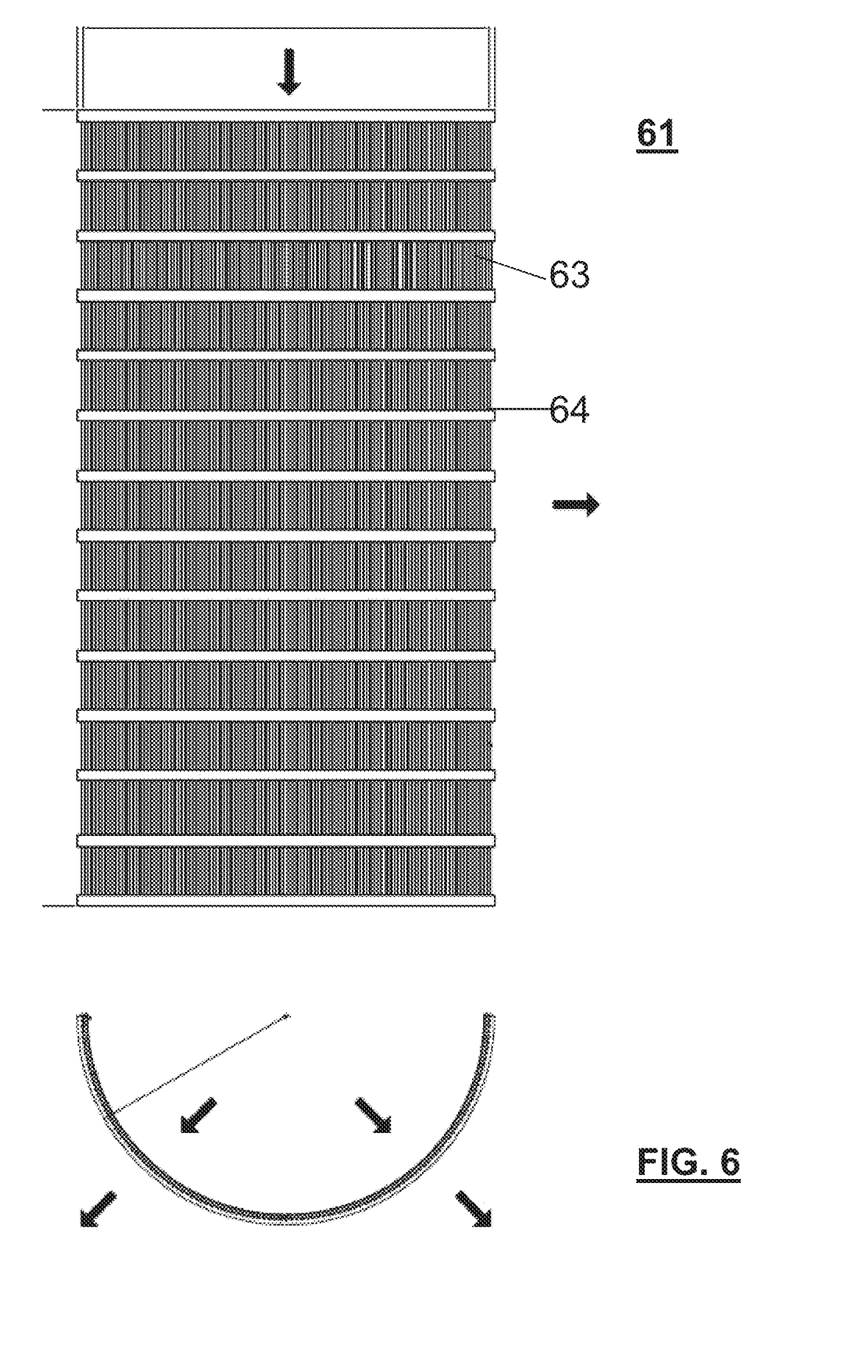

3) An in-line filter 26 with an internal cartridge of the "wedge-wire" type (hereafter described with reference to FIGS. 5, 6, 7), adapted to filter the liquid coming from the pump 21 and deliver it back, suitably filtered, to the nozzles 23, 24.

4) A counter-flow system for the filter cartridge 26, with an automatically controlled valve 27 (hereafter described with reference to FIGS. 2 and 5) arranged at the drain outlet 55 of the filter 26.

5) A system for separating the solid dirt removed by the counter-flow system, essentially composed of an expansion tank 28 and a motorized separator 29 (hereafter described with reference to FIGS. 2, 8, 9, 10) fed by the automatically controlled valve 27.

6) A self-cleaning system of the wash tub 22, with tangential water supply from above (through the mains water supply valve 20) and automatic drain control (hereafter described with reference to FIGS. 2 and 3.1).

It should be noted that the expression "substantially cylindrical", used with reference to the side wall of the tub, or the expression "substantially conical", used with reference to the tub bottom, mean that such surfaces may not be perfectly cylindrical or conical due to possible imperfections or industrial manufacturing tolerances. Moreover, the expression "substantially conical", used with reference to the tub bottom, should also be understood as truncated conical, due to the presence of the drain point at the vertex of the cone.

By the presence of the wash tube 22, the centrifugal pump 21 will not generate, at the suction point, a local drop in the level of the liquid in the tub due to the high flow rate, because it will take in water tangentially from the outlet 33 (FIG. 3.1) extending from the bottom edge of the side wall of the tub; on the contrary, it will generate a rotational motion in the bath contained in the tub, thus raising the level of the liquid at the very suction point. This makes it possible to work without generating any cavitation in the centrifugal circulation pump in the presence of a lower bath head (level of the liquid at the suction point) than in traditional systems, so that the height of the load surface can be reduced in compliance with the regulations concerning operator ergonomics. Moreover, the rotational motion of the wash bath thus generated allows the wash bath to stay in continuous motion along the cylindrical wall of the tub, thereby preventing dirt residues in solution from accumulating thereon, and also preventing the dirt from depositing locally on the bottom and ultimately obstructing it completely and/or causing sudden and abundant flows of dirt towards the pump.

The tub bottom 32 (FIG. 3.2) has a conical surface, with a drain point 35 where it is lowest: during the drain phase, this avoids as much as possible the accumulation of dirt, which, once in solution, when the pump is turned off would otherwise tend, in tubs with a flat bottom, to deposit and settle thereon.

The rotational motion of the liquid also ensures, combined with a liquid overflow outlet point, a more effective removal of the residue and foam forming on the free surface of the liquid. By properly implementing such a solution 210 (see FIG. 3.1), it is possible, without the need for a continuous weir on the tub, to remove the excess part of wash liquid and the floating residue and bring them towards the drain duct 212. In fact, since the liquid is in rotational motion, the floating residue and the foam will be continuously conveyed towards the overflow point, so that most residue and foam will be removed, while avoiding any dead areas of accumulation in suspension.

The centrifugal pump 21 (point 2 above, FIG. 4) comprises an open impeller 41 that permits the system to treat also big-sized particulate, and most importantly avoids the accumulation of soft residues within the pump impeller, which over time would obstruct the impeller passage, since no filtering is provided between the pump intake port and the tub. No further details of the pump will need to be described herein, since the construction thereof is within the grasp of a person skilled in the art.

The in-line filter 26 (point 3 above, FIG. 5) is made up of a cylindrical outer enclosure comprising, on the cylindrical skirt, an inlet 51 for dirty liquid coming from the pump 21, and an outlet 52 for the filtered liquid, which is then delivered back to the nozzles 23, 24. It also comprises a truncated conical zone 53 coaxial to the cylindrical skirt, on one side thereof, where there is another outlet 55 intercepted by a ball valve 27 and connected to the expansion tank 28 (FIG. 2).

Figure 7:
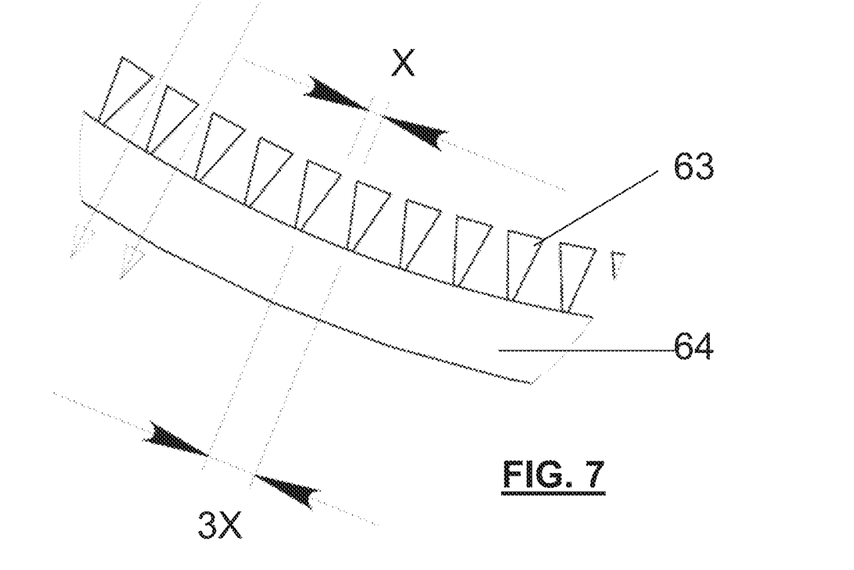

The in-line filter 26 comprises, within the cylindrical enclosure, a filter cartridge 61 of the wedge-wire type (FIGS. 6 and 7), which is highly efficient on the type of dirt to be treated. This is a special filtering sheet-metal 63 (at the cylindrical border of the filter) composed of axially arranged triangular elements, which is calendered and kept cylindrical by means of external rings 64. Two head flanges 62 are welded to this cartridge, which flanges ensure, through common lip-type seals, that the dirty liquid will enter the inner part of the filter (top arrow, FIG. 6) and will exit filtered from the outer part by flowing through the filtering wire mesh 63 (side arrow, FIG. 6), thus preventing the dirty liquid from directly flowing to the outlet port towards the nozzles. The cartridge may preferably have a 0.5 mm or 0.25 mm filtering wire mesh, depending on the application, and ensures that any smaller particulate that should pass through the filtering wire mesh will not get stuck in the filter, but will be discharged towards the wash nozzles, which are appropriately sized to dispose of any such particulate. In fact, as can be seen in FIG. 7, due to the triangular nature of the filtering element, the 0.25 or 0.5 mm opening (see dimension X in FIG. 7) is such only at the inner surface of the cylinder, and progressively increases towards the outer surface (see dimension 3X in FIG. 7), so that any residue that should pass through the inner opening will be easily disposed of. Moreover, with this construction technique the inner surface of the cartridge can be made perfectly smooth without any internal catching points and, not less importantly, a very favourable void-to-solid ratio, so that the cartridge dimensions can be greatly reduced, its filtering capacity being the same. During the normal operation, the liquid pushed by the pump enters through the inner part of the cartridge, which filters it and expels it towards the nozzles. The dirt remains inside the cartridge and deposits in the conical terminal part 53 because of the pressure of the water and the smooth walls of the filter (see flow arrows in FIG. 5).

As far as the counter-flow system is concerned (point 4 above), the inner zone 53 of the filter (FIG. 5) includes at the bottom said automatically controlled flush valve 27, which is adapted to control the periodic opening of the flushing outlet 55 for discharging the deposit produced by the filtering action towards the expansion tank 28 and the motorized separator 29. The valve is preferably automatically controlled and big in size (comparable with the inside diameter of the filter cartridge). The valve is preferably a ball valve to prevent it from seizing in operation and to obtain a larger usable flow area, the diameter being equal. At predefined intervals (depending on the amount of treated dirt), this valve opens for an automatically controlled time (at any rate of the order of tens of a second), thus generating a flow of wash liquid and dirt accumulated in the zone 53 from the inside of the filter cartridge 61 towards the expansion tank 28. Such a sudden flow discharges towards the expansion tank 28 the dirt that has accumulated in the conical part of the filter, thereby preventing it from accumulating any further and clogging the filter. This process is controlled by means of an electronic system, and the opening time results in a known water consumption (of the order of a few litres). The frequency of this flushing operation affects the required water consumption, which can be controlled to be compatible with the normal consumption necessary for system restoration.

The expansion tank is appropriately sized to abate the generated overpressure and cause the liquid and dirt residue to flow out at low pressure. Several construction techniques can be adopted to prevent the pressure at the tank inlet from being directly transmitted to the outlet tube. For this purpose, in addition to having an adequate volume, the tank also has an upper vent at ambient pressure for discharging the excess pressure. Furthermore, its construction geometry forces the fluid to slow down. The expansion tank can be constructed by a person skilled in the art on the basis of the above description.

At this point, the liquid rich in solid residue can be either conveyed directly to the client's sewer (if possible) or, whenever required, it may be further treated by means of the separation system (point 5 above), which makes it possible to dispose of the solid part of the dirt generated by the cleaning process, which is separated from the liquid part.

Figure 8:
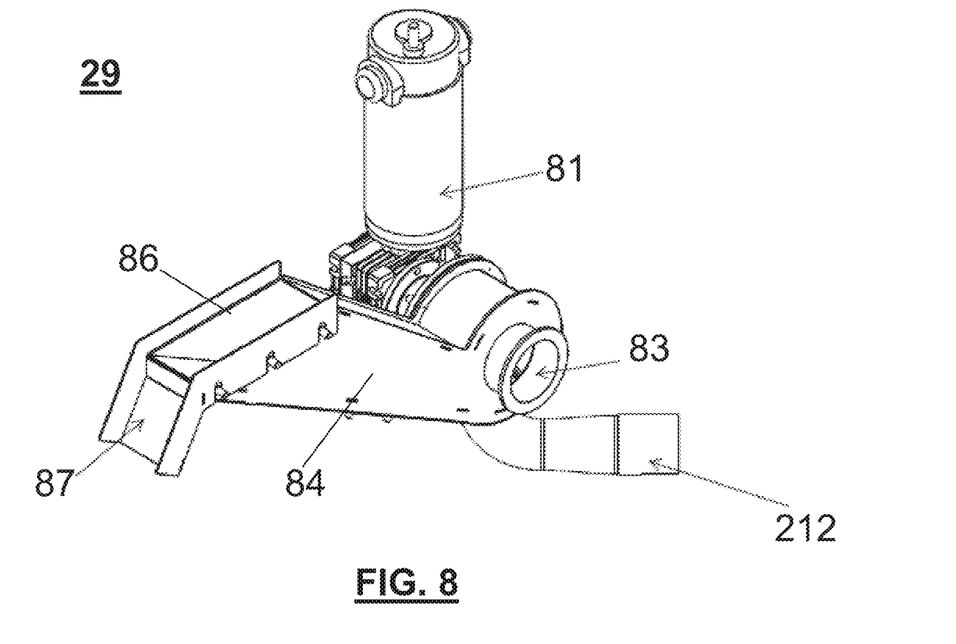
FIGS. 8, 9 and 10 show schematic views of the system for separating and disposing of the solid part of the dirt, which is a part of the system for treating wash waste liquid of the present invention.
Figure 9:
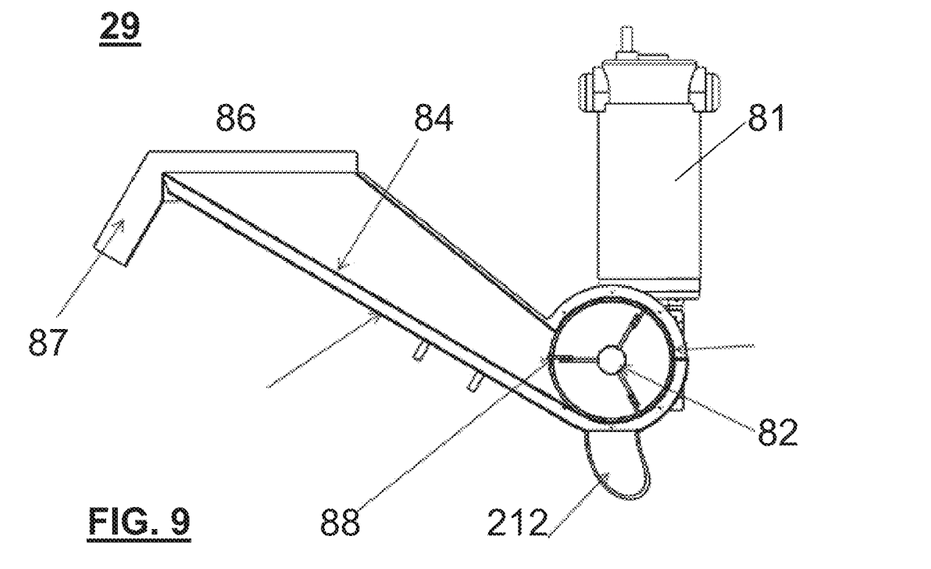
Figure 10:
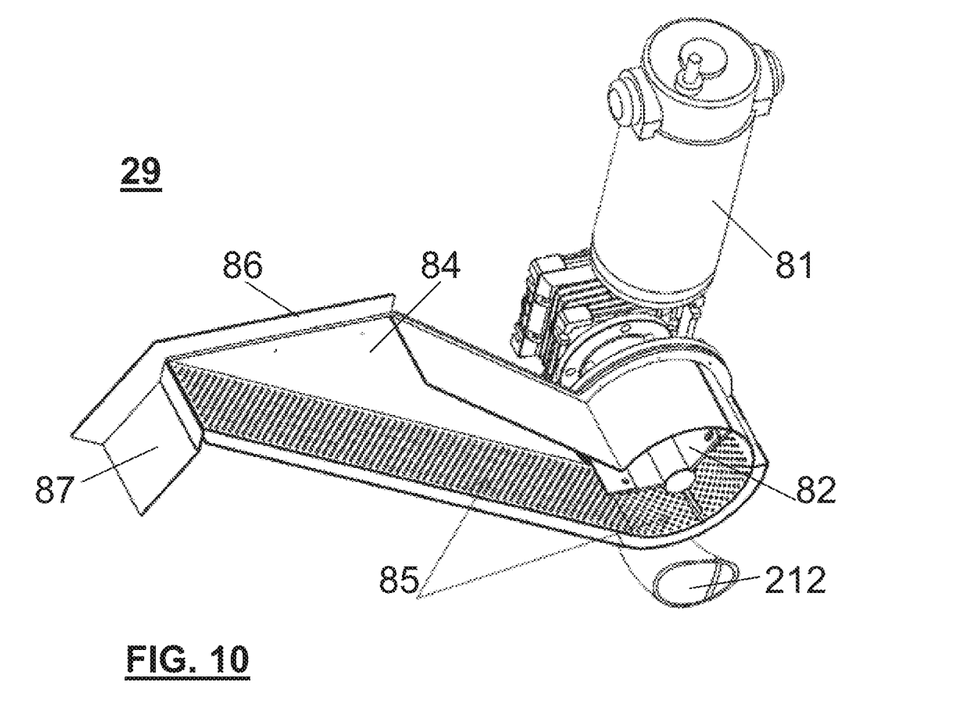

In this latter case, the bath including solid parts flows out towards a "mill" system 29 (FIGS. 8, 9, 10). It comprises a motor 81 that controls the rotation of a rotary-blade "mill" 82, to the inlet of which the waste liquid 83 is delivered from the flushing valve 27 through the expansion tank 28. The rotary blades 82 push the waste liquid onto a lifting chute 84. The latter is shaped as a box-like structure, with a first opening facing towards the rotary blades 82 and a second opening 86, on the opposite side and at a higher level than the first opening, facing towards a falling chute 87. The lifting chute 84 has a filtering wire mesh 85 on the bottom and also around the rotary blades. By means of the rotating blades and the filtering wire mesh on the bottom, the system 29 can discharge the liquid part, which flows through the filtering wire mesh and towards the drain 212, while the solid part, being rotated, is progressively transported on the chute until it falls out by gravity into a suitable collection container. Since this is a gradual process, the solid part also has the time to release much of the accumulated liquid, like some sort of wringing effect. The solid residue can thus be collected into a container that will have to be emptied manually or by means of automatic suction systems. Preferably, the rotary blades are provided with rubber terminals 88 to improve the cleaning of the filtering wire mesh.

The self-cleaning system (point 6 above) provides for supplying tub supply liquid also through the mains water supply valve 20, tangentially along the top edge of the tub, via the tangential inlet point 34 (FIG. 3.1). During the tub draining phase, the sequence includes keeping the wash pump 21 on and opening the bottom drain valve 211. The latter takes the waste liquid from the drain point 33 at the vertex of the conical bottom 32 of the tub, and discharges it into the drain duct 212 (FIG. 2).

In this way, during the draining phase and the resulting drop in the level of the liquid in the tub, a tangential flow of liquid is generated from the top along the tub walls, which removes any remaining residues as the level of the liquid lowers. The process goes on until the minimum level of liquid in the tub is reached, whereupon the wash pump 21 is turned off and the emptying of the tub continues by gravity until it is complete. In the case of large deposits, the tub parts that may remain dirty are the upper edge and the bottom, where, notwithstanding its conicity, there may still be some residues. For this reason, at the end of this drain phase a known quantity of liquid is supplied through the upper tangential inlet 34 while keeping the bottom drain valve 211 open: thanks to the tangential motion of the water, this will remove any residues from the wall and cause the residues on the bottom to escape.

The tub and the characteristic elements thereof described above are preferably made of a rigid metal-based material (e.g. steel) or plastic. The dimensions of the tub and of the characteristic elements thereof described above can be determined by a person skilled in the art as a function of the features and specifications of the washing and/or rinsing system in which it is inserted.

The system of the present invention solves the above-mentioned known problems, and in particular:

Problems of accumulation of dirt in the tubs
Cavitation problems
Impeller clogging problems
Nozzle clogging problems
Problems related to downtimes necessary for filter restoration
Problems related to separation of the solid part of the waste
Space occupation problems
Construction complexity problems The above-described non-limiting example of embodiment may be subject to variations without departing from the protection scope of the present invention.

The system for treating wash waste liquid of the invention can also be used in a discontinuous or batch-type washing and/or rinsing machine.

A further variant refers to the type of in-line filter.

It is known that some types of bedding comprise cellulose fiber. It is also possible that, though not present in the dispensed bedding, cellulose fiber may arrive at the filter because it is present in the enrichment processes used during the breeding. This type of material mixes with water and forms a film on all surfaces touched by water, in particular on the inner wall of the filter cartridge and may obstruct the water flow through the cartridge mesh. In such a case, the counter-washing action may prove substantially ineffective on this film, which will then have to be removed mechanically.

Figure 11:
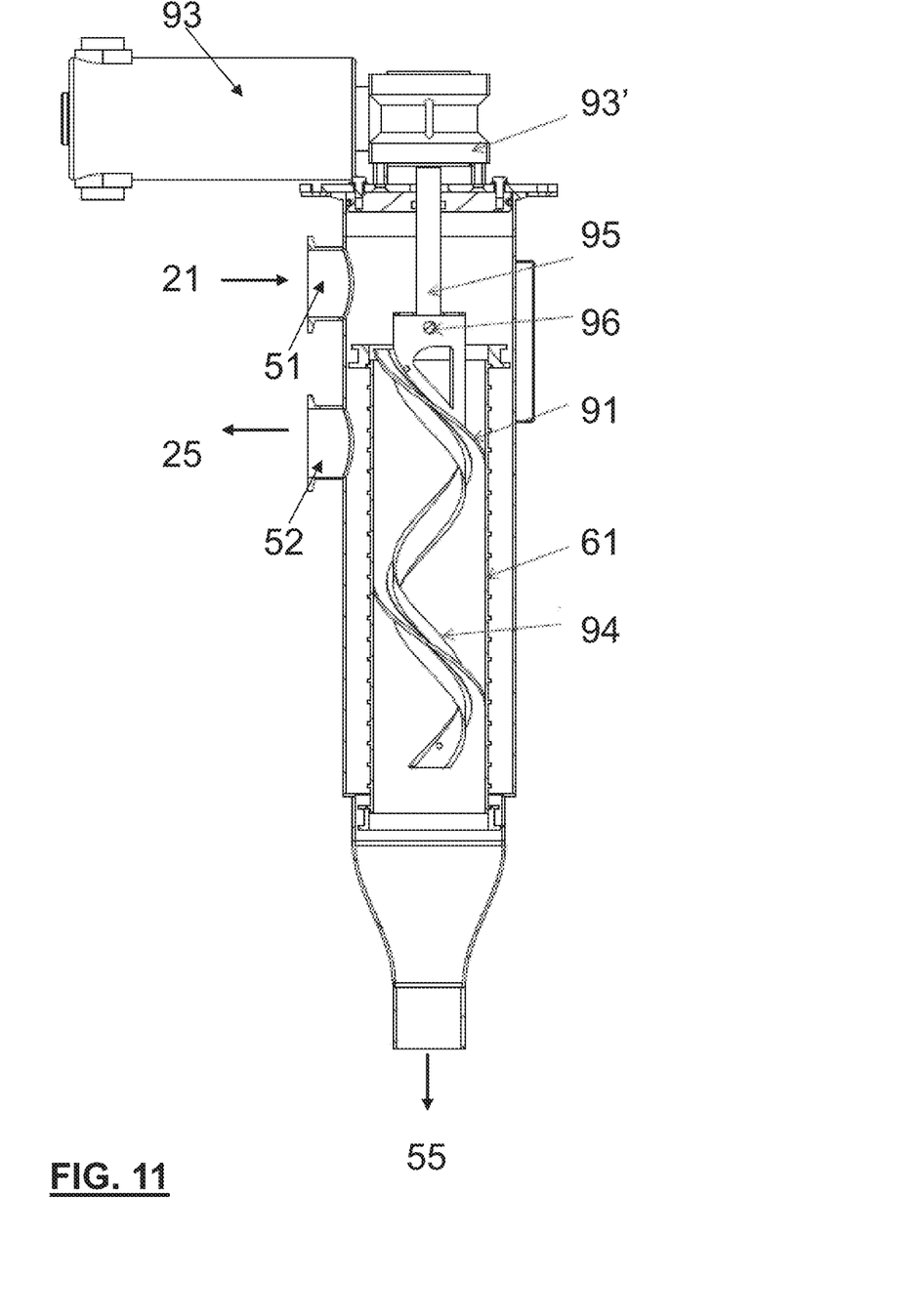
FIGS. 11 and 12 show a variant of the in-line filter.
Figure 12:
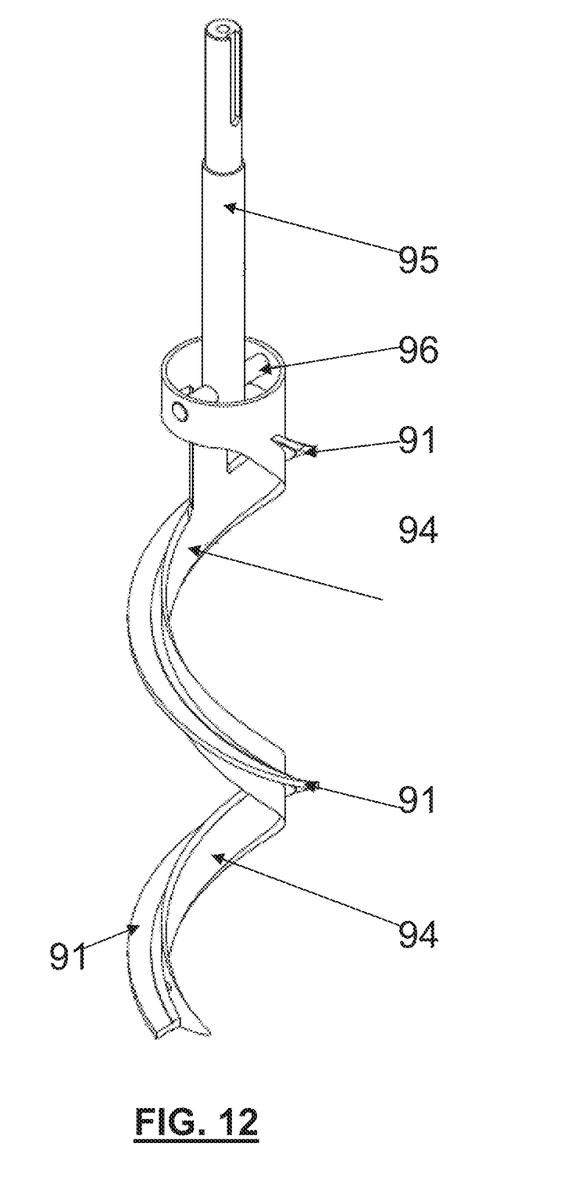

With reference to FIGS. 11 and 12, in order to attain this result while at the same time preserving the possibility of performing a counter-wash to continue disposing of the solid part of the bedding, into the filter cartridge 61 a screw-type brush 91 may be conveniently inserted, the size of which is such that it will scrape, while turning, the cylindrical inner wall of the filter cartridge 61, thereby removing the formed film, which will then flow towards the above-described outlet 55.

The screw-type brush 91 is fixed to a support 94, which is also screw-shaped, and is rotated by means of a suitable motor 93. It is preferable that the connection of the screw to the reducer is effected by leaving as much space as possible for the flow of the waste liquid inside the filter, in the regions of the liquid inlet 51 and outlet 52 and in the region of the drain 55, so that the washing will remain efficient and without any obstruction (flow 51-52) and the counter-wash will keep disposing of the solid part (flow 51-55) without being hindered by the connection members between the screw and the motor reducer. For this reason, the brush is secured to the screw-type support 94, which supports the brush profile while still allowing the radial and axial flow of the washing water. The brush may be made of flexible material, e.g. plastic, and the support may be made of metallic rigid material, e.g. steel.

The whole assembly is then connected to the motor 93 by means of a transmission shaft 95, through a radial transmission coupling 96 that allows for self-centering of the system.

In this manner, a combined effect of film removal (the film is removed and moved downwards through the effect of the rotation of the screw-type brush) and disposal of the solid deposit (by counter-washing) is attained during the process.

The elements and features shown in the various preferred embodiments may be combined together without however departing from the protection scope of the present invention.

From the above description, those skilled in the art will be able to produce the object of the invention without introducing any further construction details.

What is claimed is:

1. A continuous tunnel washing system comprising:
a wash chamber including a plurality of nozzles positioned to direct a washing liquid at objects within the wash chamber;
an open top cylindrical wash tub having a substantially conical bottom and a wash waste drain outlet at a vertex of the substantially conical bottom, a tangential liquid suction outlet extending through a bottom portion of the wash tub and positioned to generate a rotational motion of any liquid in the wash tub, the wash tub being positioned under the wash chamber such that spent washing liquid drains into the wash tub through the open top;
a centrifugal wash pump with an open impeller being fluidically connected to the tangential liquid suction outlet, wherein any liquid in the wash tub is caused to rotate as the liquid is drawn through the tangential liquid suction outlet by the centrifugal wash pump;
an inline filtration assembly including a housing having an inlet fluidically connected to an outlet of the centrifugal wash pump and an outlet fluidically connected to the plurality of nozzles, a wedge-wire filter element being disposed within the housing between the inlet and outlet of the housing such that liquid entering the housing inlet passes through the wedge-wire filter element which captures debris as liquid flows to the outlet of the housing; and
a flush valve controlling flow through an outlet located at a bottom of the housing to permit discharge of any captured debris.

2. The continuous tunnel washing system of claim 1, wherein, the wedge-wire filter element is substantially cylindrical.

3. The continuous tunnel washing system of claim 2, wherein, the cylindrical wedge-wire filter element is open at both ends, with one open end placing the interior of the cylindrical wedge-wire filter element in fluid communication with the housing inlet, wherein liquid to be filtered can pass through the cylindrical wedge-wire element and to the outlet of the housing.

4. The continuous tunnel washing system of claim 3, wherein, the other open end is in fluid communication with the outlet at the bottom of the housing to permit captured debris to be flushed out of the interior of the cylindrical wedge-wire filter element and the housing.

5. The continuous tunnel washing system of claim 2, further comprising a motor driven rotatable brushing member capable of removing debris from the interior of the substantially cylindrical wedge-wire filter element.

6. The continuous tunnel washing system of claim 5, wherein, the motor driven brushing member is supported by a screw shaped member.

7. The continuous tunnel washing system of claim 1, further comprising a tangential inlet port positioned in an upper end of a sidewall of the wash tub positioned to introduce a tangential inlet flow into the tub in a direction concordant with the flow direction generated by the tangential liquid suction outlet.

8. The continuous tunnel washing system of claim 1, wherein an upper end portion of the housing is cylindrically shaped and a lower end portion of the housing extends from the bottom of the cylindrically shaped portion and is conically shaped.

9. The continuous tunnel washing system of claim 1, further comprising:
   a mill system for receiving and disposing of captured debris being discharged from the inline filtration assembly including:
   a rotary blade mill having an inlet positioned to receive captured debris discharged from the outlet at the bottom of the housing;
   a motor for controllably rotating the blades of the rotary blade mill;
   a rectangular lifting chute having a chute inlet facing the blades and a chute outlet at the opposite end of the chute and at a higher elevation than the chute inlet; and
   a filtering wire mesh defining the bottom of the lifting chute and around the rotary blades to permit liquid to drain from the discharged captured debris while solids are pushed up the chute by the rotary blades and out the chute outlet and onto a falling chute.

10. The continuous tunnel washing system of claim 1, wherein the wash tub further comprises an overflow to permit excess spent wash liquid to exit to a drain.

11. The continuous tunnel washing system of claim 1, wherein the wash tub is rigid and comprises a metal or polymeric material.

12. The continuous tunnel washing system of claim 1, wherein the wedge-wire filter element is substantially cylindrical and comprises:
   a cylindrical side wall of filtering sheet-metal comprising triangular elements;
   external rings calendering and maintaining the substantially cylindrical shape; and
   head flanges.

13. The continuous tunnel washing system as in claim 12, wherein the triangular elements define between themselves a minimal gap towards the inner sheet-metal surface of the cylindrical wedge-wire element, and a maximal gap at the outer surface.

14. The continuous tunnel washing system as in claim 13, wherein the ratio between said maximal and minimal gaps is 3, and said minimal gap has a value of 0.25 mm to 0.5 mm.

* * * * *